D. BOURQUE.
MACHINE FOR PRODUCING SPRING ENCIRCLED MEMBERS.
APPLICATION FILED FEB. 7, 1918.
1,332,539.
Patented Mar. 2, 1920.
6 SHEETS—SHEET 2.
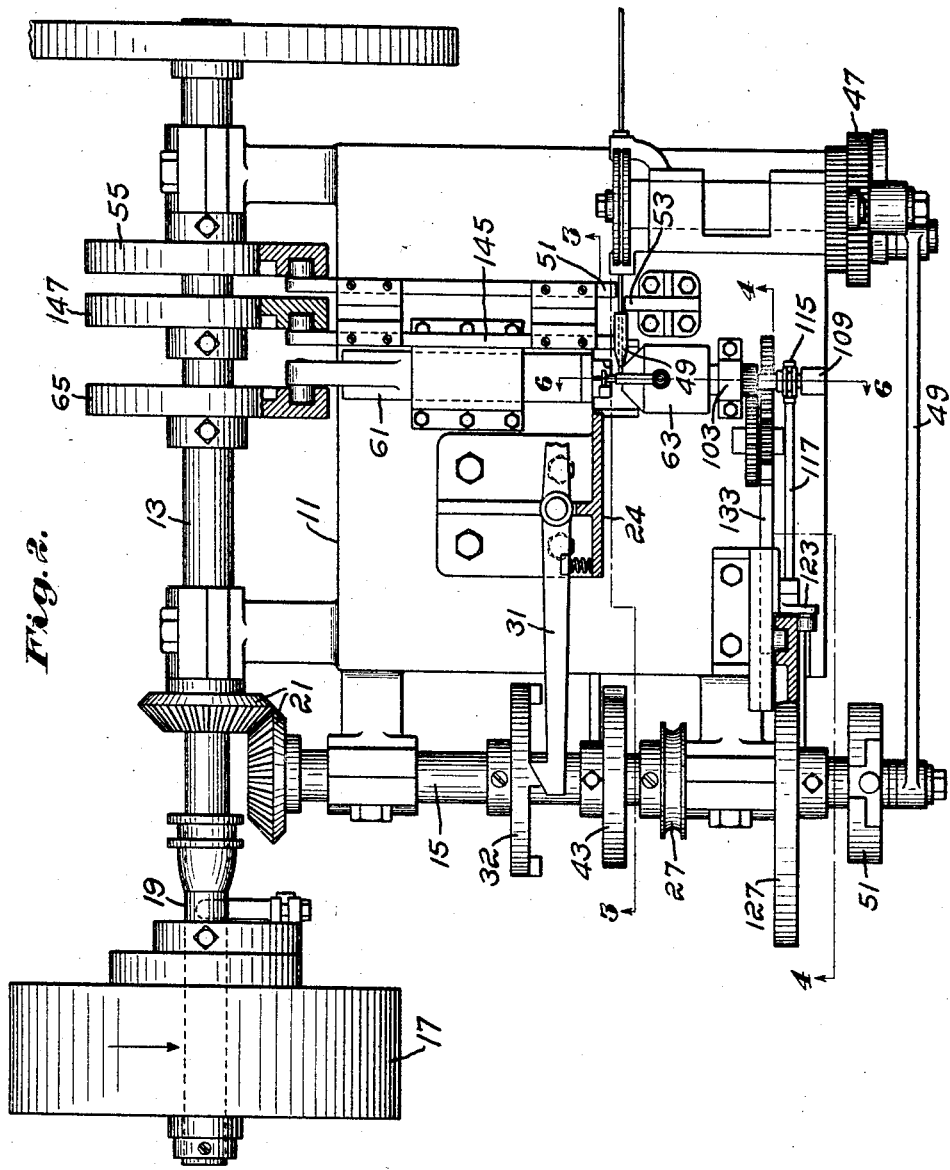
Inventor:
David Bourque,
by Emery, Booth, Janney + Varney
Attys.

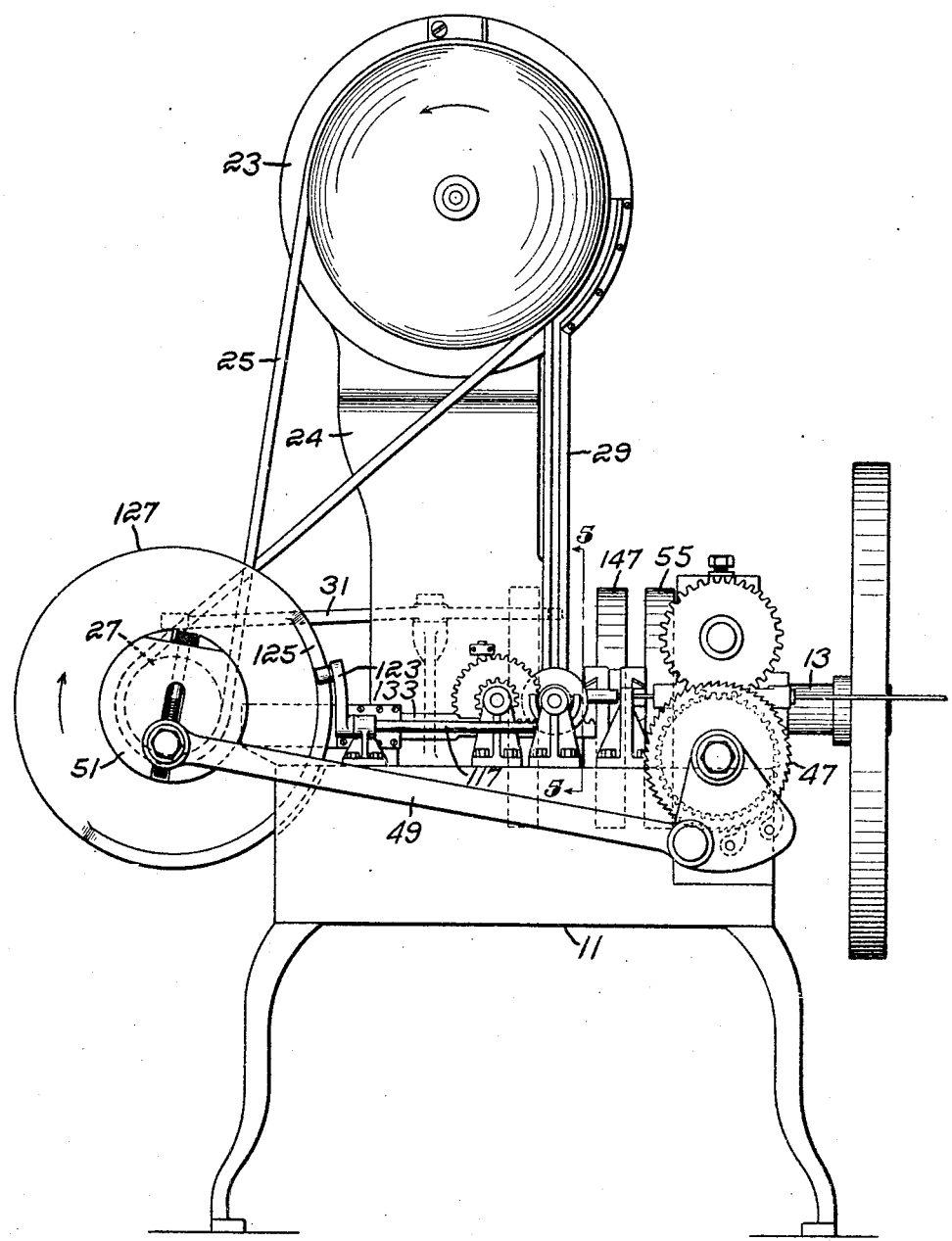

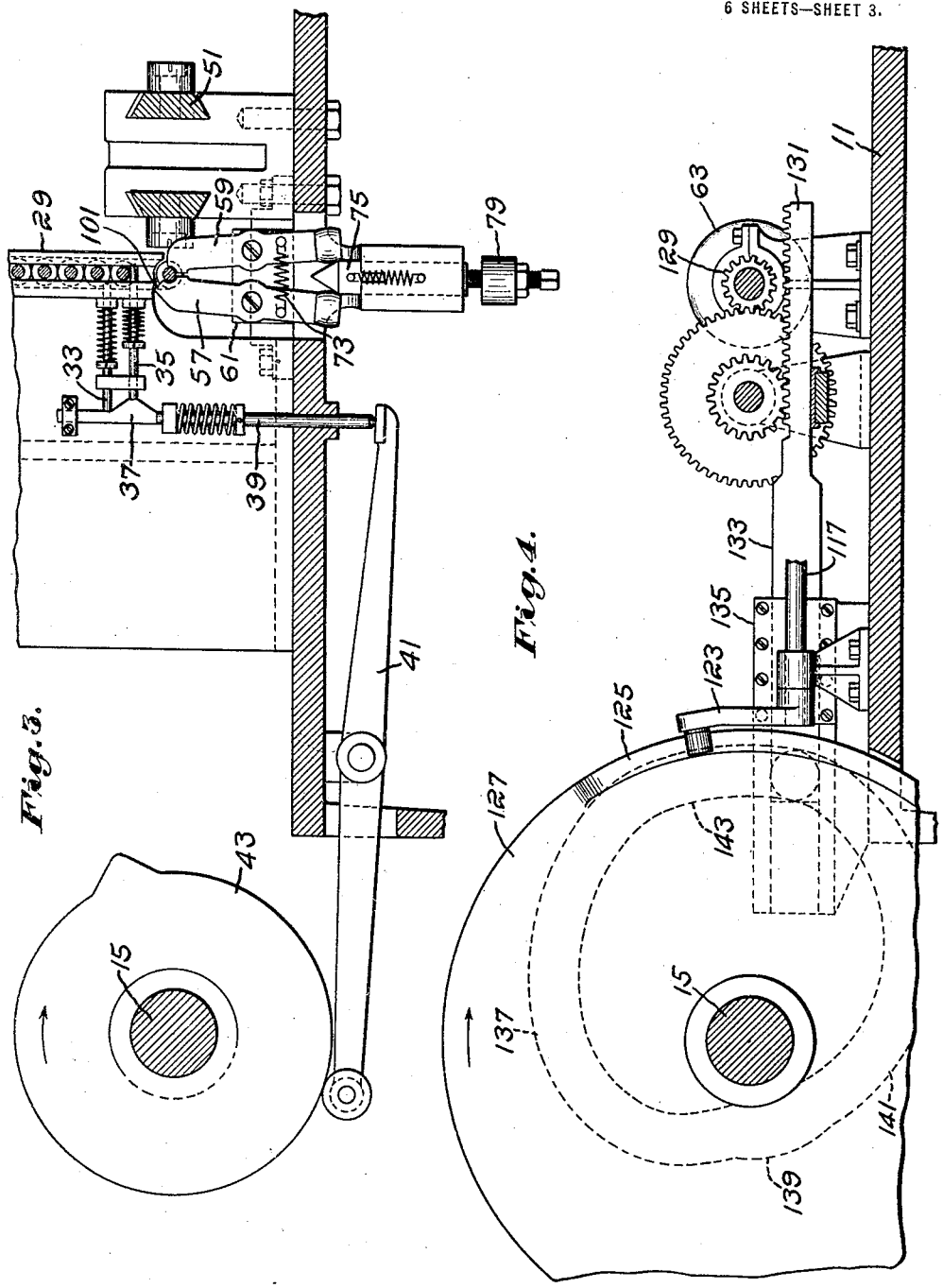

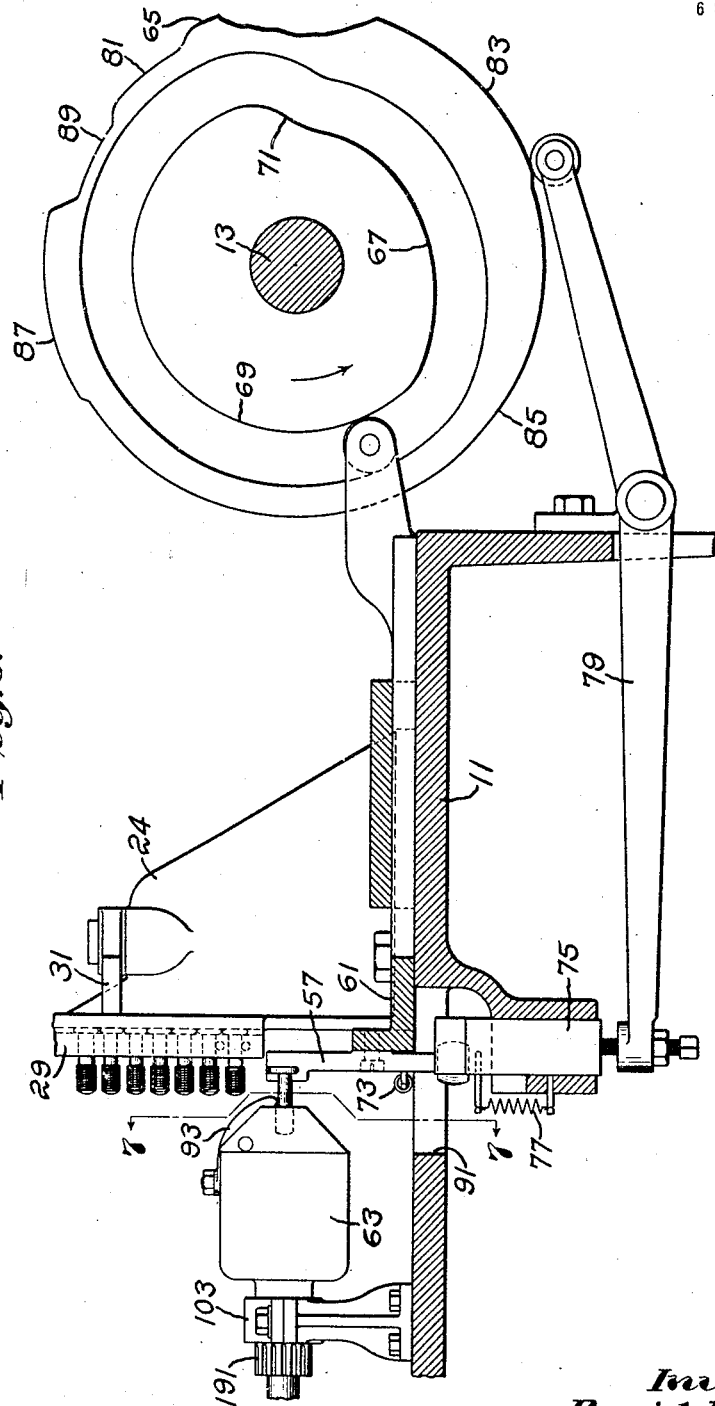

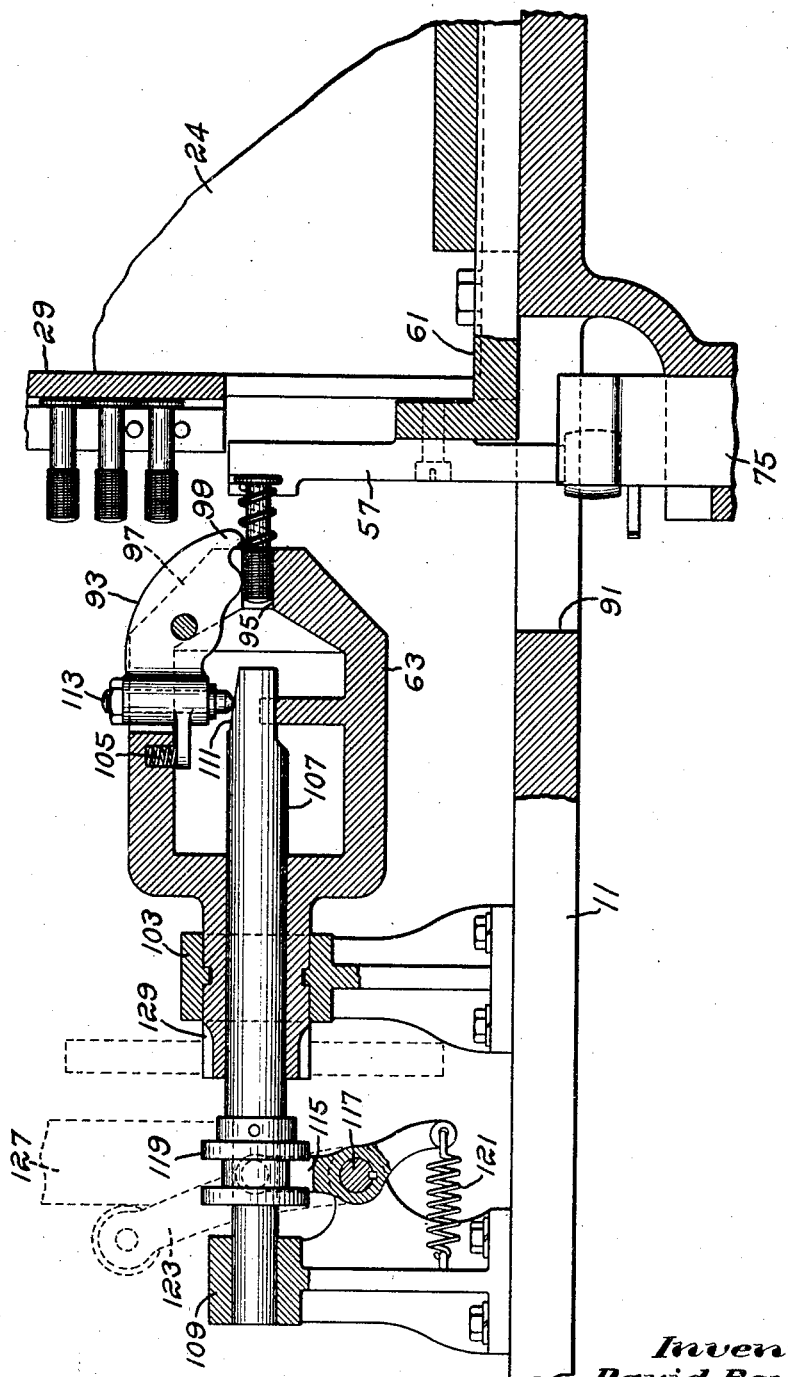

D. BOURQUE.
MACHINE FOR PRODUCING SPRING ENCIRCLED MEMBERS.
APPLICATION FILED FEB. 7, 1918.

1,332,539.

Patented Mar. 2, 1920.
6 SHEETS—SHEET 6.

Inventor:
David Bourque,
by Emery, Booth, Janney & Varney
Attys.

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

MACHINE FOR PRODUCING SPRING-ENCIRCLED MEMBERS.

1,332,539.      Specification of Letters Patent.      Patented Mar. 2, 1920.

Application filed February 7, 1918. Serial No. 215,747.

*To all whom it may concern:*

Be it known that I, DAVID BOURQUE, a citizen of the United States, and resident of Amesbury, in the county of Essex and State of Massachusetts, have invented an Improvement in Machines for Producing Spring-Encircled Members, of which the following description, in connection with the accompanying drawings, is a specification, like characters on the drawings representing like parts.

This invention relates to a machine for producing members with encircling springs, the particular embodiment herein shown being designed to provide a headed pin or stud with an encircling helical spring. Such an assembly is adapted for use in making turn button fasteners, such for example as are shown in my Patent No. 1,201,682. The pin and spring may be treated as a unit in the further assembling of the fastener.

My invention will best be understood by reference to the following description of one specific embodiment thereof taken in connection with the accompanying drawings illustrating the same wherein:—

Figure 1 is an elevation of the machine, the view being from the bottom of Fig. 2;

Fig. 2 is a plan, a standard being cut away and appearing in section;

Fig. 3 and Fig. 4 are sections on lines 3—3 and 4—4 of Fig. 2 respectively.

Fig. 5 is a section on line 5—5 of Fig. 1;

Fig. 6 is a section on line 6—6 of Fig. 2;

Figure 8:
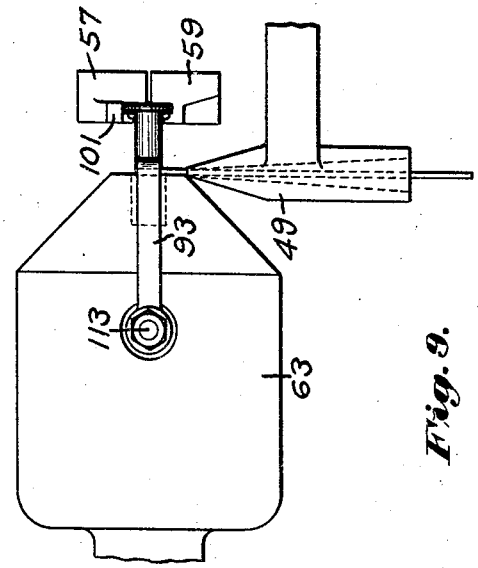
Figs. 8 and 9 are details in plan of certain parts in different phases of their movement.

It will somewhat facilitate comprehension of the following description of the specific mechanisms disclosed in the drawings if I first briefly refer to the position of the frame, driving shafts and other fundamental elements in the illustrated form of the machine, since it will be necessary to refer to these from time to time in describing the other mechanism. Referring, therefore, to Figs. 1 and 2, the mechanism is here shown mounted on a suitable frame or table 11 along two adjacent sides of which shafts 13 and 15 are supported in suitable brackets. The shaft 13 may be driven by a pulley 17 which may be clutched thereto by any suitable form of clutch mechanism, herein denoted generally by the numeral 19. Miter gears 21 connect the two shafts.

I shall next describe the exemplary mechanisms here disclosed whereby the materials operated on are delivered to the more essential operating mechanisms and shall first describe the delivery of the pins. These may be assorted from bulk by any suitable device such as the rotary hopper 23 (Fig. 1) carried by standard 24 rising from the table 11 and driven by belt 25 from pulley 27 (Fig. 2) on shaft 15. They are delivered by this assorting device to a chute or raceway 29 in which they are confined by their heads in the usual manner (see Figs. 3 and 6). Their descent in the raceway may be facilitated by a tapper 31 operated by cam 32 (Fig. 2) on shaft 15.

Referring to Fig. 3, the pins in the machine shown are released one by one from the chute to the operating mechanism by means of a suitable escapement which may comprise pins 33 and 35 entering the side of the chute and pressed by springs which tend to move them free of the same. A reciprocating cam member 37 carried by spring pressed rod 39 coöperates with pins 33 and 35. In the position shown, pin 33 is clear of the raceway and the pin 35 extends across the same and sustains the pins therein. If the rod 39 is moved upwardly against the force of its spring, rod 33 will be thrust inwardly between the lowest and next highest pin and rod 35 will be released and withdrawn from beneath the lowest pin by the spring encircling the same. The lowest pin can thus drop free of the others to the operating mechanism hereafter to be described. The rod 39 may be reciprocated at proper times by a lever 41 operated by cam 43 on shaft 15.

Figure 7:
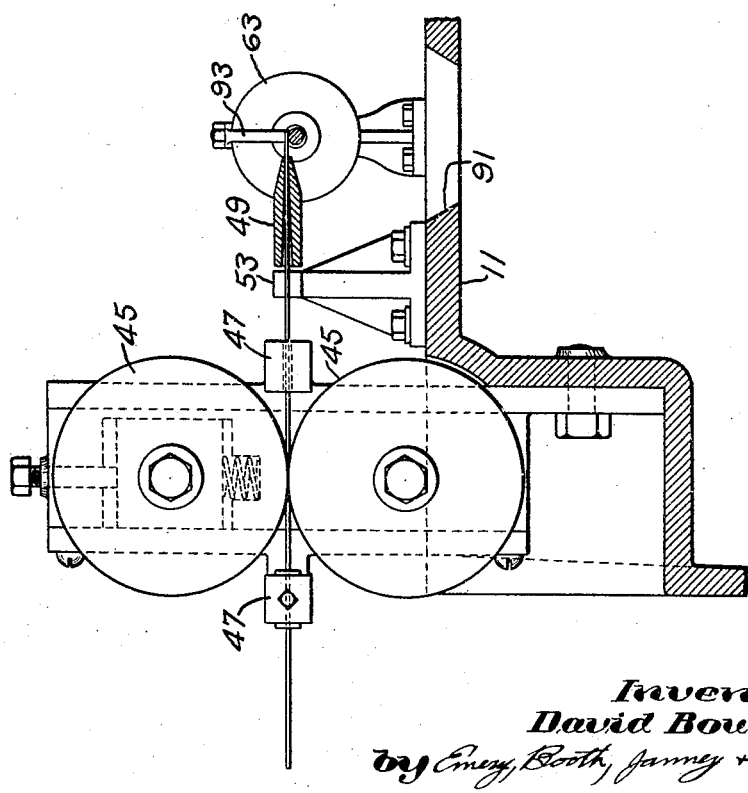
Fig. 7 is a section on line 7—7 of Fig. 5.

The springs are herein formed directly from wire. Referring to the illustrative structure of Figs. 1 and 7, the wire is fed forward by a pair of feed rolls 45 driven through a pawl and ratchet mechanism 47 by connecting rod 49 secured to the crank disk 51 on shaft 15. At proper times a suitable length of wire is fed forward by the feed rolls 45 through the guides 47 and into a tubular member 49 hereinafter to be described in greater detail. After the wire has been fed, a proper length thereof is severed by the coöperation (see Fig. 2) of a movable shear blade 51 and a fixed shear blade 53, the former being operated by cam 55 on shaft 13. The proper length of wire to form a spring will thus be provided, the wire being supported by the elongated tubular guide 49.

I shall next describe the operation of the particular mechanism here disclosed for assembling the wire in coiled form about the shank of the pin and in so doing will for the time being disregard the particular mechanism operating the parts. As seen in Fig. 3, the pin is, in the present embodiment of the invention, delivered by the escapement mechanism to a pair of pivoted jaw members 57 and 59 which are mounted on a slide 61 (Fig. 5). These jaws receive the pin and deliver it to a chuck 63. Referring to Fig. 5, the slide 61 is operated by the groove of a cam 65. The portion 67 of the cam groove moves the jaws 57 and 59 from a position beneath raceway 29 to the left to deliver a pin held thereby to chuck 63. The portion 69 of the cam then holds the slide stationary while the pin is held by the chuck and the latter is operating. The portion 71 then returns the jaws in position to receive another pin from the raceway 29.

In the operation of the device as illustrated, the jaws should close upon the pin with a greater or less degree of tightness during various periods of the cycle of the machine. Referring to Figs. 3 and 5, the pivoted jaw levers 57 and 59 are connected by a spring 73 normally tending to open the same and they may be closed by means of a wedge 75 adapted to be pressed inwardly between their lower ends to close the jaws against the force of spring 73. The wedge 75 is normally drawn away from the jaw levers by spring 77 against which it may be raised by lever 79 operated by the edge of cam 65 before referred to. The ends of the jaw levers 57 and 59 are provided with rollers, as shown, to facilitate their movement with the slide 61 when the wedge is in position.

Referring to Fig. 5, the action of the wedge is as follows:—When the follower on the end of lever 79 contacts with the part 81 of the cam, the wedge 75 is partially raised and the jaws are half closed. They occupy this position when beneath raceway 29 and will freely admit a pin released thereto. The cam rotating in a counterclockwise direction, the portion 83 of the cam is next effective firmly to clamp the jaws about the pin. This will cause it to straighten up and it will be held firmly while the slide 61 advances it to the left and delivers it to the chuck 63. The surface 85 will then act and the jaws will be relaxed to permit the chuck to move the pin. Preferably, however, they fit the head of the pin sufficiently snugly to provide a support therefor in the nature of a journal bearing while it is rotated by the chuck and to position the same against the draft of the wire as will be more fully apparent hereafter. Part 87 of the cam closes the jaws tightly once again during which time they withdraw the pin to the right in Fig. 5 away from the chuck. The cam follower then enters the depression 89 and the jaws relax and drop the pin, which now has the coiled wire assembled therewith, it falls through opening 91 and the cycle is repeated.

In the machine here illustrated the wire is coiled directly about the pin. For this purpose I may provide chuck 63 with a movable jaw 93 which closes on the pin and the chuck rotates the same so as to draw the wire about the same. Referring to Fig. 6, the chuck may be in the form of a shell having a central opening 95 to receive the end of the pin. The shell may be cut away as shown at 97 to provide a slot substantially radial to the opening and jaw 93 is pivoted in this slot. The jaw may be provided with a bill 99 and when as seen in Fig. 8, which shows the parts at the inception of the coiling operation, the wire is fed forward across the right hand face of the chuck the jaw will close to clamp the wire between such face and the bill and against the pin. The chuck is then rotated and the member 49 is moved to the right, viewing Figs. 8 and 9. This traversing movement of the wire provides the necessary pitch to the helix and thus a coil is formed directly around the pin. The elongated guide 49 supports the wire and enforces bending of the same into the coil except at the extreme end. Preferably, as seen in Figs. 3, 8 and 9, the upper end of jaw 57 has an extended portion 101 which coöperates with the end of the length of wire as it leaves the tubular member 49 and acts to wipe the same over smoothly around the shank of the pin, completing the coil.

In explaining the detailed construction illustrated I will first describe means for operating the jaw of the chuck. The chuck 63 is rotatably mounted in a journal bearing. The jaw 93 is pivoted and normally pressed in open position by spring 105. A rod 107 supported in a bearing 109 and movable longitudinally through the journal of the chuck is provided with a wedge-shaped end 111 adapted to ride along the end of an adjusting screw 113 in the inner end of the jaw 93 and to rock the jaw against the force of spring 105 to close the same to clamping position. The rod 107 may be operated by a yoke lever 115 mounted on a rock shaft 117, the yoke lever being connected to a collar 119 on the rod in the familiar manner of clutch shifting levers and the like, as will be well understood. Lever 115 is normally rocked by means of a spring 121 to thrust the rod to the right so as to hold the jaw 93 in clamping position, but may be operated against the force of the spring by means of the rock shaft 117 which, as seen in Fig. 4, is provided with a crank arm 123 coöperating with a cam rise 125 on cam 127 of shaft 15. The mechanism is so timed that lever 115 is released to spring 121 when the jaws 57 and 59 have inserted the pin in the chuck. The chuck will then hold the pin and the wire clamped until the winding is completed and the cam rise will then act to loosen the grip of the chuck and permit jaws 57 and 59, which are then closed tightly upon the end of the pin by rise 87 (Fig. 5) of cam 65, to withdraw the pin with the wound spring thereon.

I shall next describe the means shown for rotating the chuck to effect winding of the spring and in so doing shall refer more particularly to Figs. 4 and 6. The hub of chuck 63 is provided with a pinion 129 driven through a suitable gear train shown in Fig. 4 from a rack 131 which forms an extension of slide 133 movable in guides 135 and operated by the groove of cam 127. Referring to Fig. 4 and assuming the jaw of the chuck to have closed upon pin and wire, the cam is turning clockwise and just as the follower of arm 123 rides off the rise 125, the follower of slide 133 enters portion 137 of the cam groove which draws the slide to the left rotating pinion 129 and therefore chuck 63 counterclockwise, viewing the figure. The throw of the cam is such in the example illustrated as to give the chuck three turns. The follower then enters the portion 139 of the groove which is circular and the chuck is held at rest. The portion 141 then acts to thrust the slide 133 to the right again in readiness for a new stroke and the parts are held at rest by circular portion 143 of the groove while another pin is being inserted.

Figure 9:
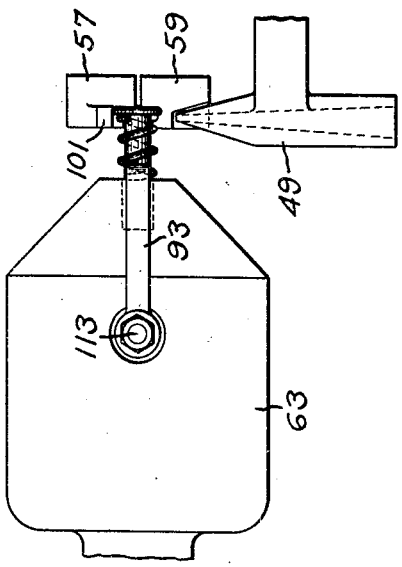

The tubular wire guide 49 shown in two phases of its movement in Figs. 8 and 9 may be secured (see Fig. 2) to a slide 145 operated by cam 147 on shaft 13.

It will be understood that I use the word "pin" as a convenient word which will be readily understood, in view of the present disclosure, when reference is made to the member on which the spring is assembled and not because of any connotation thereof limiting the scope of my invention.

Having thus described in detail the mechanical structure of the machine shown, the principles illustrated thereby which I regard as new and desire to secure by Letters Patent I shall express in the following claims:—

1. In a machine of the class described, pin supply means, supporting means for individual pins, means to feed wire to a pin in said supporting means and means for coiling the same about the pin.

2. In a machine of the class described, pin supply means, supporting means for individual pins, means to feed wire to a pin in said supporting means and means to revolve the pin to coil the wire thereabout.

3. In a machine of the class described, means to deliver individual pins to a point of operation, means to supply wire to said point, means to apply force longitudinally of said wire to wind it about the pin and means coöperating with said force applying means to provide a pitch to the windings to produce a helix.

4. In a machine of the class described, a rotary chuck, means to deliver pins thereto, a wire guide, wire feeding means, means to clamp wire delivered through said guide against the pin and means to cause a relative movement of longitudinal translation between said chuck and guide whereby the wire is helically coiled on rotation of said chuck.

5. In a machine of the class described, a chuck, means to deliver pins thereto, a wire guide, wire feeding means, means to clamp wire delivered through said guides to said chuck and means for effecting relative rotary and translatory movements of said chuck and said guide.

6. In a machine of the class described, means to provide lengths of wire, rotary wire coiling means having provision for holding the end of a length of wire, a rectilinearly movable member through which the wire passes to the coiling means and a wiper opposite the member at the end of its travel to engage the other end of the wire.

7. In a machine of the class described for handling headed pins, a pin delivering raceway, means for releasing individual pins therein, means at the delivery end of said raceway movable to close on the head of such released pin whereby to cause the pin to project in a predetermined direction and coöperating wire handling means to surround the pin so projecting with a wire helix.

8. The constituent mechanism in a machine of the class described comprising a pin receiving and wire holding chuck, a pin delivering raceway opposite the chuck, pin receiving jaws and means to close and unclose said jaws and move them to and from said chuck, substantially as described.

9. The constituent mechanism in a machine of the class described comprising a rotary chuck, a pin delivering raceway, jaw members beneath said raceway, means to cause relative movements of approach and recession between said members and chuck and means to close and unclose said jaws whereby they may present the pin to the chuck and also provide a supporting bearing therefor in the rotation thereof.

10. In a machine of the class described, a rotary chuck, a pin delivering raceway, jaw members beneath said raceway, means to cause relative movements of approach and recession between said members and chuck, means to close and unclose said jaws whereby they may present the pin to the chuck and also provide a supporting bearing therefor in the rotation thereof, and a reciprocating wire guide movable in the direction of the axis of rotation, one of said jaw members being formed to receive the end of the wire from said guide to wipe it down.

11. The constituent mechanism in a machine of the class described comprising a rotary member having provision for supporting a coil receiving part and having an abutment face adjacent said part, said face being recessed, means to feed wire across said face, a gripper jaw opposing said recess and means to operate the same to grip the wire across the sides of the recess and exteriorly of the coil-receiving part.

12. A mechanism as defined in claim 11 wherein a member pivoted in said recess is provided with a bill serving as the gripper jaw.

In testimony whereof I have signed my name to this specification.

DAVID BOURQUE.